(12) United States Patent
Baldwin (10) Patent No.: US 8,880,950 B2
(45) Date of Patent: Nov. 4, 2014

(54) METHOD, APPARATUS OR SOFTWARE FOR PROCESSING EXCEPTIONS PRODUCED BY AN APPLICATION PROGRAM

(75) Inventor: Timothy John Baldwin, Swanmore (GB)

(73) Assignee: International Business Machines Corporation, Armonk, NY (US)

( * ) Notice: Subject to any disclaimer, the term of this patent is extended or adjusted under 35 U.S.C. 154(b) by 182 days.

(21) Appl. No.: 13/406,755

(22) Filed: Feb. 28, 2012

(65) Prior Publication Data

US 2012/0159266 A1    Jun. 21, 2012

Related U.S. Application Data

(62) Division of application No. 12/635,783, filed on Dec. 11, 2009, now Pat. No. 8,549,269.

(30) Foreign Application Priority Data

Mar. 10, 2009    (EP) ..................................... 09154730

(51) Int. Cl.
*G06F 11/00* (2006.01)

(52) U.S. Cl.
USPC ......................................................... 714/38.1

(58) Field of Classification Search
USPC ......................................................... 714/38.1
See application file for complete search history.

(56) References Cited

U.S. PATENT DOCUMENTS

| | | | |
|---|---|---|---|
| 6,684,270 B1 * | 1/2004 | Chmara et al. ................... | 710/38 |
| 2004/0243999 A1 * | 12/2004 | Taivalsaari ........................ | 718/1 |
| 2007/0245099 A1 * | 10/2007 | Gray et al. ...................... | 711/156 |
| 2008/0155238 A1 * | 6/2008 | Airaud et al. .................. | 712/244 |
| 2009/0217298 A1 * | 8/2009 | Circello et al. ................ | 719/318 |

* cited by examiner

*Primary Examiner* — Scott Baderman
*Assistant Examiner* — Jigar Patel
(74) *Attorney, Agent, or Firm* — Steven M. Greenberg, Esq.; CRGO Law (57) ABSTRACT

A method, apparatus and software is disclosed in which original exceptions issued by an application program are encoded as substitute exceptions with associated metadata identifying the original exception so as to enable to enable a first application program receiving the exception but not arranged to process the original exception to process the substitute exception and to enable a second application program receiving the exception and arranged to process the original exception to extract and process that original exception.

12 Claims, 6 Drawing Sheets

METHOD, APPARATUS OR SOFTWARE FOR PROCESSING EXCEPTIONS PRODUCED BY AN APPLICATION PROGRAM

CROSS-REFERENCE TO RELATED APPLICATIONS

This application is a Divisional of U.S. patent application Ser. No. 12/635,783, currently pending, filed on Dec. 11, 2009, claims priority under 35 U.S.C. §119(a) to European Patent Application Serial Number 09154730.7, filed Mar. 10, 2009, entitled "A Method, Apparatus or Software for Processing Exceptions Produced by an Application Program", the entirety of which is incorporated herein by reference.

FIELD OF INVENTION

The present invention relates to a method, apparatus or software for processing exceptions produced by an application program.

BACKGROUND OF THE INVENTION

Computer systems commonly comprise a plurality of intercommunicating application programs such as client and server application programs. A client application program may invoke processing on a server application program and typically receives any processing error or failure indications via exceptions generated by the server application program. The server application program generates a predetermined set of exceptions and commonly each such exception is specific to a particular error or failure. Thus client application programs are arranged to identify and process each exception appropriately in accordance with the server application program error or failure represented.

One problem with this arrangement occurs when the server application program is updated for example, to fix problems or for a new version release. The updated server application program may comprise a modified or extended set of exceptions to provide for removed or additional error conditions. However any client application program code that was complied against a previous version of the server application program may not be capable of identifying or processing such new exceptions. This can lead to processing errors in older versions of client application programs when new exceptions are received that cannot be appropriately processed.

SUMMARY OF THE INVENTION

An embodiment of the invention provides a method for processing exceptions produced by an application program, the method comprising the steps of:

a) identifying a first set of exceptions produced by both a first version of a first application program and by a second version of the first application program subsequent to the first version;

b) identifying a second set of exceptions produced by the second version of the first application program but not by the first version;

c) receiving an original exception from the second set of exceptions from the second version of the first application program;

d) substituting the original exception for a predetermined substitute exception from the first set of exceptions; and e) appending an identification of the original exception as metadata to the substitute exception so as to enable a second application program receiving the substitute exception but not arranged to process the second set of exceptions to process the substitute exception and to enable a third application program receiving the substitute exception and arranged to process members of the second set of exceptions to extract and process the original exception.

The third application program may be a subsequent version of the second application program. The first application program may be a server application program and the second and third application programs may be client application programs corresponding to the server application program. The first and second sets of exceptions may comprise an exception hierarchy having a root exception at the root of the hierarchy and the substitute exception may be a selected ancestor to the original exception in the hierarchy. The metadata may comprise an ordered list of substitute exceptions in the form of a plurality of selected ancestors to the original exception in accordance with the hierarchy. The ordered list may comprise all ancestors to the original exception. The substitute exception may be the root exception. The original exception may comprise message data in an exception data portion and the message data is replicated in an exception data portion for the substitute exception.

The method may comprise a part of a serialization process to enable transmission of exception objects to communicating application programs. The substitute exception may be specified as a replacement object for the original exception object in the serialization process. The metadata may be serialized as additional data associated with the substitute exception object in the serialization process.

Another embodiment provides a method for processing an exception received from an application program, the method comprising the steps of:

a) receiving exception data for an application program, the received exception data comprising a first exception and metadata identifying a second exception;

b) identifying the set of exceptions that the application program is capable of processing;

c) if the application program is capable of processing the first exception then providing the first exception to the application program for processing; and d) if the application program is not capable of processing the first exception then providing the second exception to the application program for processing.

A further embodiment provides apparatus for processing exceptions produced by an application program, the apparatus being operable to:

identify a first set of exceptions produced by both a first version of a first application program and by a second version of the first application program subsequent to the first version;

identify a second set of exceptions produced by the second version of the first application program but not by the first version;

receive an original exception from the second set of exceptions from the second version of the first application program;

substitute the original exception for a predetermined substitute exception from the first set of exceptions; and append an identification of the original exception as metadata to the substitute exception so as to enable a second application program receiving the substitute exception but not arranged to process the second set of exceptions to process the substitute exception and to enable a third application program receiving the substitute exception and arranged to process members of the second set of exceptions to extract and process the original exception.

Another embodiment provides apparatus for processing an exception received from an application program, the apparatus being operable to:

receive exception data for an application program, the received exception data comprising a first exception and metadata identifying a second exception;

identify the set of exceptions that the application program is capable of processing;

if the application program is capable of processing the first exception then provide the first exception to the application program for processing; and if the application program is not capable of processing the first exception then provide the second exception to the application program for processing.

A further embodiment provides an exception data structure for transmitting an exception between application programs, the exception data structure comprising:

a first exception data portion arranged to store data identifying a first exception; and a metadata portion arranged to store data identifying a second exception, the metadata portion being arranged to enable a first application program receiving the exception data structure but not arranged to process the second exception to process the first exception and to enable a second application program receiving the exception data structure and arranged to process the second exception to extract and process the second exception.

Another embodiment provides a computer program product loadable into the internal memory of a digital computer, comprising software code portions for performing, when the product is run on a computer, a method for processing exceptions produced by an application program, the method comprising the steps of:

a) identifying a first set of exceptions produced by both a first version of a first application program and by a second version of the first application program subsequent to the first version;

b) identifying a second set of exceptions produced by the second version of the first application program but not by the first version;

c) receiving an original exception from the second set of exceptions from the second version of the first application program;

d) substituting the original exception for a predetermined substitute exception from the first set of exceptions; and e) appending an identification of the original exception as metadata to the substitute exception so as to enable a second application program receiving the substitute exception but not arranged to process the second set of exceptions to process the substitute exception and to enable a third application program receiving the substitute exception and arranged to process members of the second set of exceptions to extract and process the original exception.

A further embodiment provides a computer program product loadable into the internal memory of a digital computer, comprising software code portions for performing, when the product is run on a computer, a method for processing an exception received from an application program, the method comprising the steps of:

a) receiving exception data for an application program, the received exception data comprising a first exception and metadata identifying a second exception;

b) identifying the set of exceptions that the application program is capable of processing;

c) if the application program is capable of processing the first exception then providing the first exception to the application program for processing; and d) if the application program is not capable of processing the first exception then providing the second exception to the application program for processing.

Another embodiment provides a computer program product loadable into the internal memory of a digital computer, comprising software code portions for providing, when the product is run on a computer, apparatus for processing exceptions produced by an application program, the apparatus being operable to:

identify a first set of exceptions produced by both a first version of a first application program and by a second version of the first application program subsequent to the first version;

identify a second set of exceptions produced by the second version of the first application program but not by the first version;

receive an original exception from the second set of exceptions from the second version of the first application program;

substitute the original exception for a predetermined substitute exception from the first set of exceptions; and append an identification of the original exception as metadata to the substitute exception so as to enable a second application program receiving the substitute exception but not arranged to process the second set of exceptions to process the substitute exception and to enable a third application program receiving the substitute exception and arranged to process members of the second set of exceptions to extract and process the original exception.

A further embodiment provides a computer program product loadable into the internal memory of a digital computer, comprising software code portions for providing, when the product is run on a computer, apparatus for processing an exception received from an application program, the apparatus being operable to:

receive exception data for an application program, the received exception data comprising a first exception and metadata identifying a second exception;

identify the set of exceptions that the application program is capable of processing;

if the application program is capable of processing the first exception then provide the first exception to the application program for processing; and if the application program is not capable of processing the first exception then provide the second exception to the application program for processing.

BRIEF DESCRIPTION OF THE DRAWINGS

Embodiments of the invention will now be described, by way of example only, with reference to the accompanying drawings in which:

FIG. 4b is an example of an exception produced in accordance with the data structure of FIG. 4a;

FIG. 5 is a flow chart illustrating the processing performed in an application program producing an outgoing exception in accordance with the data structure of FIG. 4a; and FIG. 6 is a flow chart illustrating the processing performed in an application program receiving an incoming exception in accordance with the data structure of FIG. 4a.

DETAILED DESCRIPTION OF EMBODIMENTS OF THE INVENTION

Figure 1:
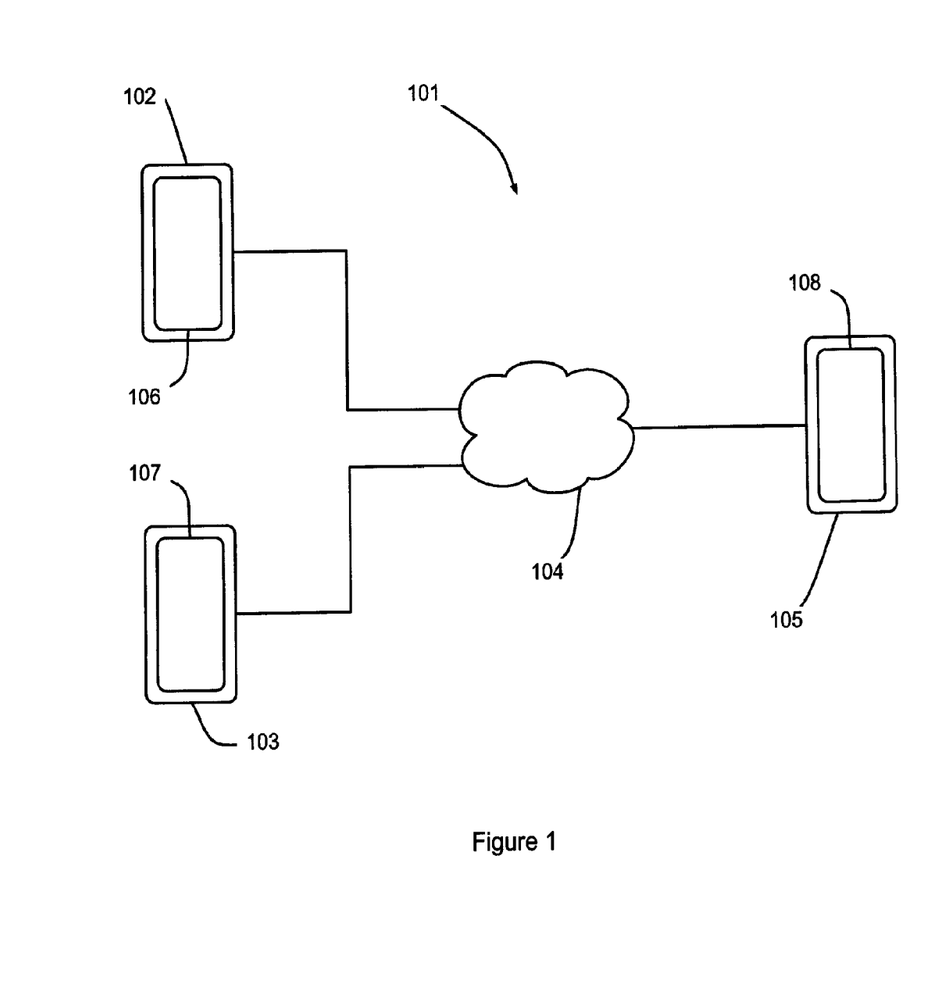
FIG. 1 is a schematic illustration of a computer system comprising a server computer and a plurality of client computers which together providing a data processing system.

With reference to FIG. 1, a computer system 101 comprises first and second computers 102, 103 connected via a network 104 to a third computer 105. The first and second computers 102, 103 are provided with respective operating systems 106, 107 that each provides a platform for application programs in the form of data processing client application programs. Similarly, the third computer 105 is loaded with an operating system 108 also providing a platform or for an application program in the form of data processing server application program. Together, the computers 102, 103, 105 and their respective software provide a data processing environment in which users of the client computers 102, 103 can control the processing of data on the server computer 105.

Figure 2:
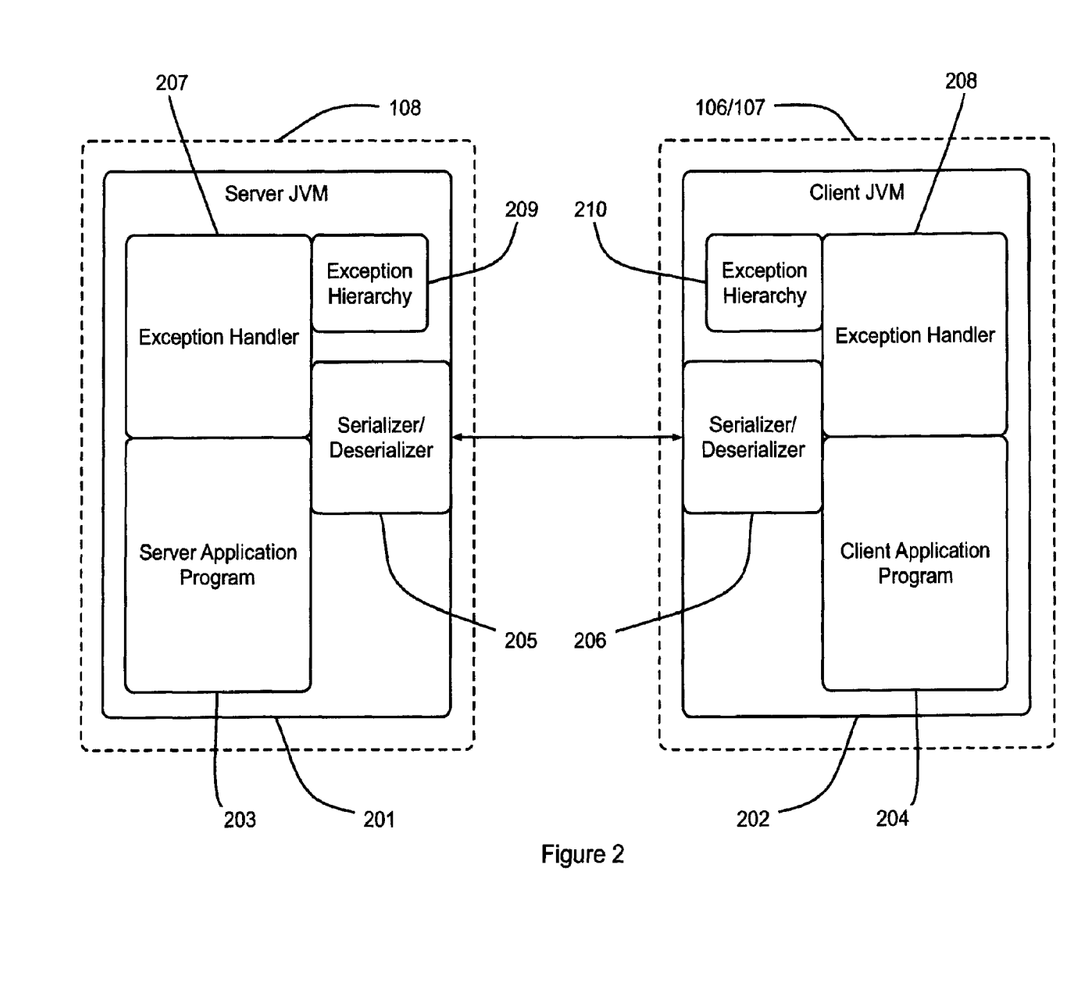
FIG. 2 is an illustration of the functional software elements of server and client application programs in the data processing system of FIG. 1.

With reference to FIG. 2, in the present embodiment, for both the client and server operating systems 107, 108, 109, the processing platform comprises an object oriented processing environment in the form of respective Java™ virtual machines (JVM) 201, 202 within which a respective server application program 203 and client application programs 204 are loaded. In the present embodiment, the application programs 203, 204 use serializer/deserializer modules 205, 206 for communicating objects between the programs 203, 204. The serializer/deserializer modules 205, 206 are arranged to convert objects into a suitable form for transmission over the network 104 between the programs 203, 204, thus enabling object based interactions between the application programs 203, 204. Each of the application programs 203, 204 is further provided with respective exception handler modules 207, 208 and a corresponding set of exceptions that can be processed, in the form of respective exception hierarchies 209, 210. The respective exception hierarchies 209, 210 comprise a portion of common exceptions and a portion of different exceptions. Thus not all exceptions produced by one of the application programs may be processed by one or more of the other application programs.

Figure 3:
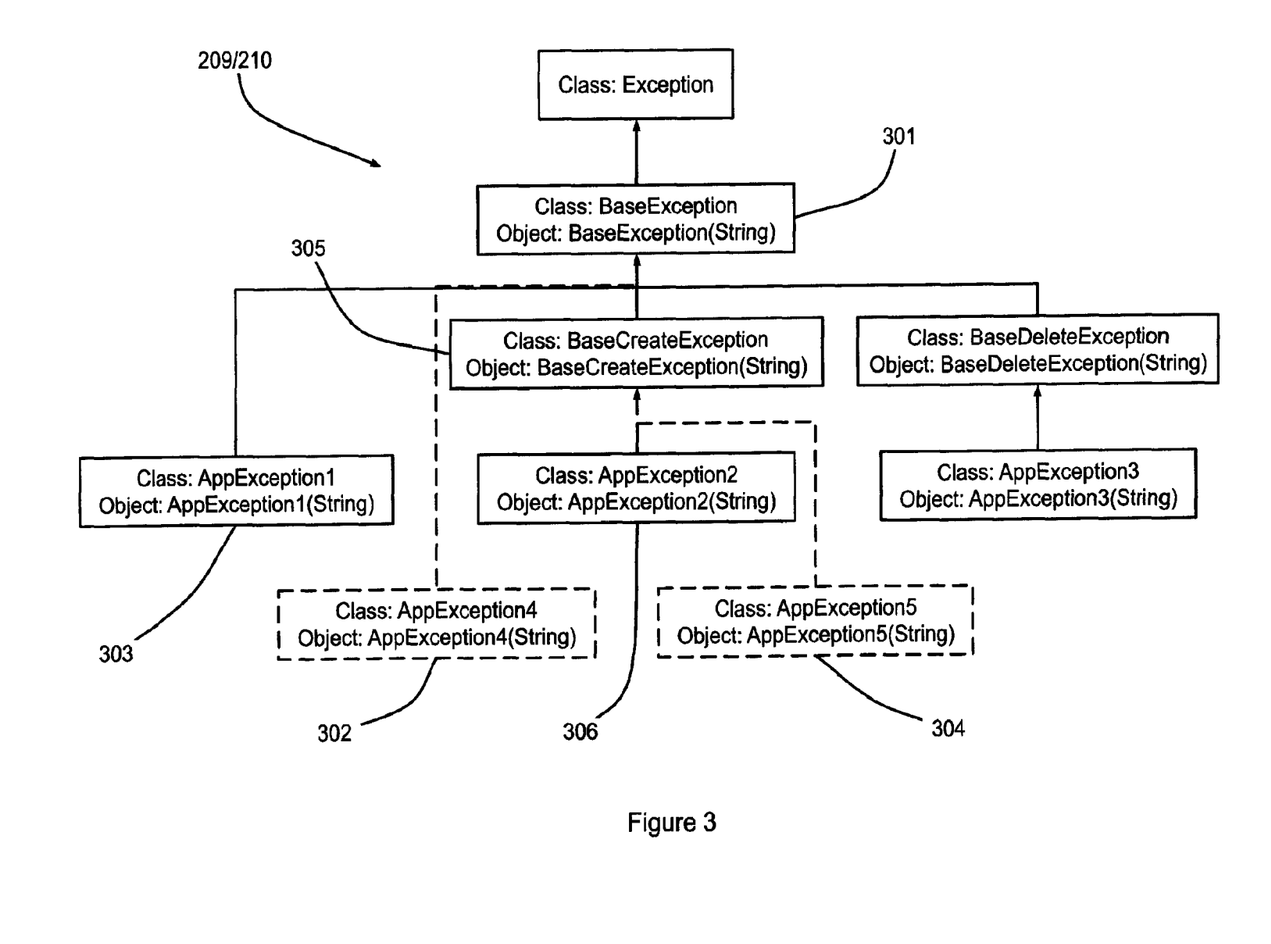
FIG. 3 is a schematic illustration of overlaid exception hierarchies for the server and client application programs of FIG. 2.

FIG. 3 shows the respective exception hierarchies 209, 210 in further detail. The common elements of the exception hierarchies 209, 210 are shown overlaid with continuous outlines. The additional elements in the server exception hierarchy 209 are indicated by dotted outlines. As will be understood by those in the art, both exception hierarchies 209, 210 comprise a common root in the form of a root or base exception 301. In the present example, the server exception hierarchy 209 has two additional exceptions. The first additional exception, in the form of the "AppException4" exception 302, has been added to the server exception hierarchy 209 as a sibling to the "AppException1" exception 303 and has the base exception 301 as its parent. The second additional exception, in the form of the "AppException5" exception 304, has been added to the server exception hierarchy 209 as a sibling to the "AppException2" exception 303 and has the "BaseCreateException" exception 305 as its parent. As shown in FIG. 3, in the present embodiment, each exception in the respective hierarchies 209, 210 are defined by both the Java™ class that creates the exception and the exception object itself.

In the present embodiment, the differences in the respective hierarchies 209, 210 results from the server application program 203 having been updated to a subsequent version while the client application programs 204 have not been correspondingly updated and were thus compiled against a previous version of the server application program. Such cross compiling of the client application programs and corresponding server application program is arranged to ensure both maintain common exception hierarchies. As will be understood by those in the art, disparity in client/server exception sets or hierarchies may result from other changes to the respective application programs.

Figure 4A:
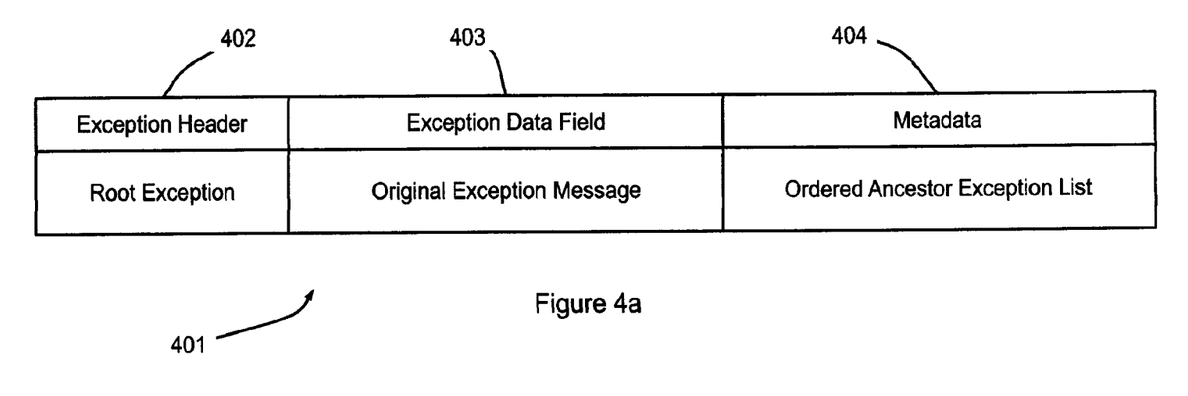
FIG. 4a is a schematic illustration of the data structure for exceptions transmitted between the server and client application programs of FIG. 2.

In the present embodiment, with reference to FIG. 4a, in response to the issuing of an exception by the server application program 203, the exception handler 207 is arranged to intercept and modify the received outgoing exception. The modification of the outgoing exception is performed in accordance with a predetermined substitute exception format 401. The substitute exception format comprises an exception header 402 and an exception data field 403, which are both in common with the format of the original exception. In addition, a metadata field 404 is appended to the substitute exception format. In the present embodiment, the modifying process performed by the exception handler 207 is arranged to substitute the original exception produced by the server application program 203 with a substitute exception in accordance with the substitute exception format 401. In the present embodiment, the substitute exception header 402 comprises an identification of the root or base exception 301. The base exception is selected as it is present in all of the exception hierarchies 209, 210 and can thus be processed by all of the application programs 203, 204. The exception data field 403 is provided for storing any fixed exception data known to be common to all exception classes. In the present embodiment, the original exception message, if present, is inserted into the exception data field 403. The metadata field 404 comprises and ordered list of data representing the ancestors of the original exception in accordance with the server exception hierarchy 209.

Figure 4B:
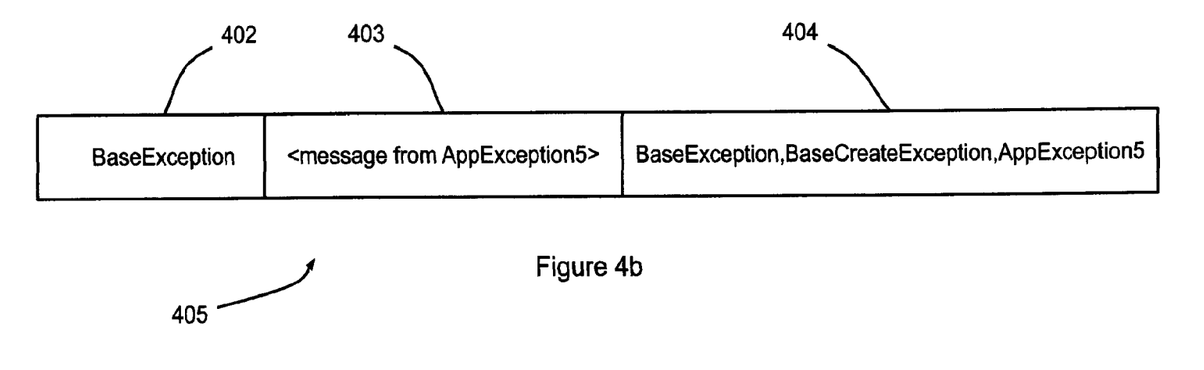

FIG. 4b shows an example substitute exception 405 produced by the exception handler 207 in response to an original outgoing exception in the form of the "AppException5" exception 304 from the server exception hierarchy 209. The exception header 402 of the substitute exception 405 comprises data identifying the base exception 301. The exception data field 403 comprises the message data from the original "AppException5" exception. In addition, the metadata field 404 comprises an order list of the ancestors for the "AppException5" exception in accordance with the server exception hierarchy 209, that is:

BaseException, BaseCreateException, AppException5.

In the present embodiment, the exception handlers 208 for the client application programs 204 are arranged to recognize the substitute exception format 401 and to treat the exception according to its corresponding exception hierarchy 210. In other words, if the given exception hierarchy 210 comprises the original exception, as identified in the metadata 404, then the original exception is reconstituted and passed to the client application program 204. If, however, the given exception hierarchy 210 does not comprise the original exception, the exception handler 208 identifies the first ancestor from the metadata 404 that is present in the client exception hierarchy 210 and creates such an ancestor exception, including the message data 403 from the original exception, and passes this ancestor exception to the client application program 204. This process may result in the root exception being provided to the client application program 204 where none of the root's siblings, as defined in the metadata 404, are present in the client exception hierarchy 210. If the exception handler for a given application program that receives the substitute exception 405 is not arranged to inspect the metadata 404, the exception will be handled as a base exception by default.

In the present embodiment, the server exception handler 207 is arranged to utilize the serialization functionality of the JVM to modifying an exception object issued by an application program. Similarly, the client exception handler 208 is arranged to utilize the deserialization functionality of the JVM for reconstituting an exception in its original form, an ancestor form or root form. The JVM serialization mechanism enables the serialization of a substitute object instead of an original object and for the serialization of additional data associated with a given object. The JVM deserialization mechanism enables a complimentary process in which the additional data may be taken into account or ignored and not deserialized. In the present embodiment, such existing suitable elements of the serialization/deserialization functionality are controlled or instructed by the relevant exception handler 207, 208.

Figure 5:
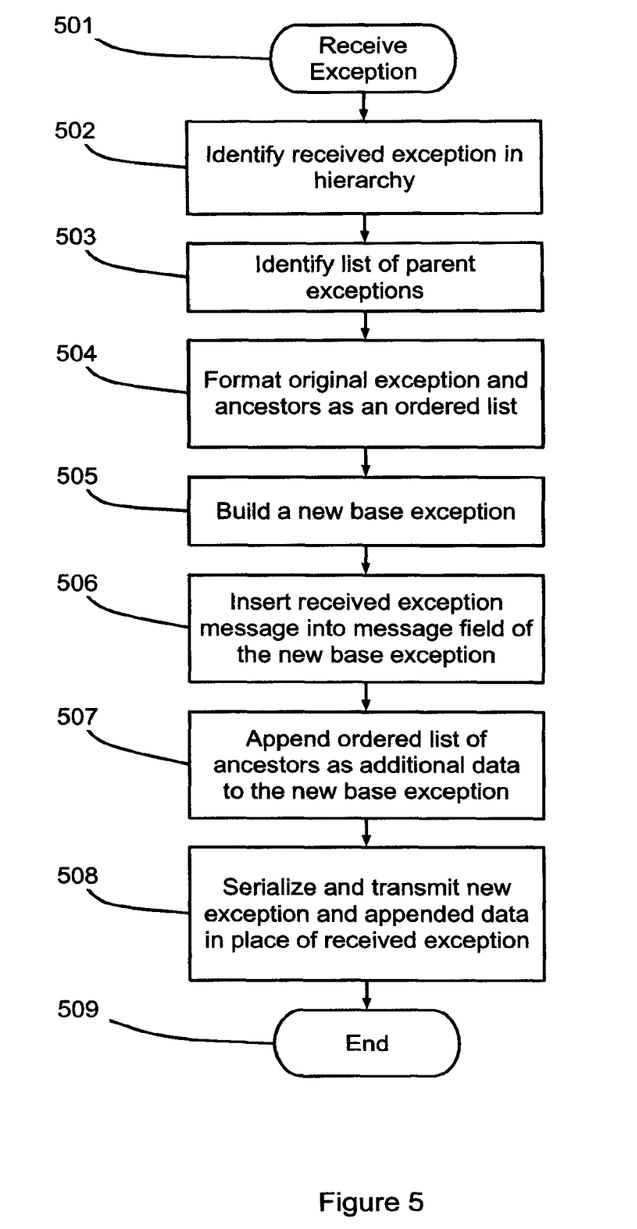

The processing performed by the server exception handler 207 when processing an outgoing exception received from the server application program 203 will now be described in further detail with reference to the flow chart of FIG. 5. Processing is initiated at step 501 by the receipt of an outgoing exception from the server application program 203 and processing moves to step 502. At step 502, the received exception is identified in the exception hierarchy 209 and processing moves to step 503. At step 503, the list of all ancestor exceptions is determined from the exception hierarchy 209 and processing moves to step 504. At step 504, an ordered list of the original exception and its ancestors is compiled and processing moves to step 505. At step 505, a new base exception object is created and processing moves to step 506. At step 506, the exception message from the original received exception, if present, is inserted into the substituted exception created in step 505 and processing moves to step 507. At step 507, the ancestor list is appended as metadata to the new substitute exception and processing moves to step 508. At step 508, the substitute exception object is serialized and its appended metadata serialized as additional serialization data and the serialized data is communicated to its destination. Processing then moves to step 509 and ends.

Figure 6:
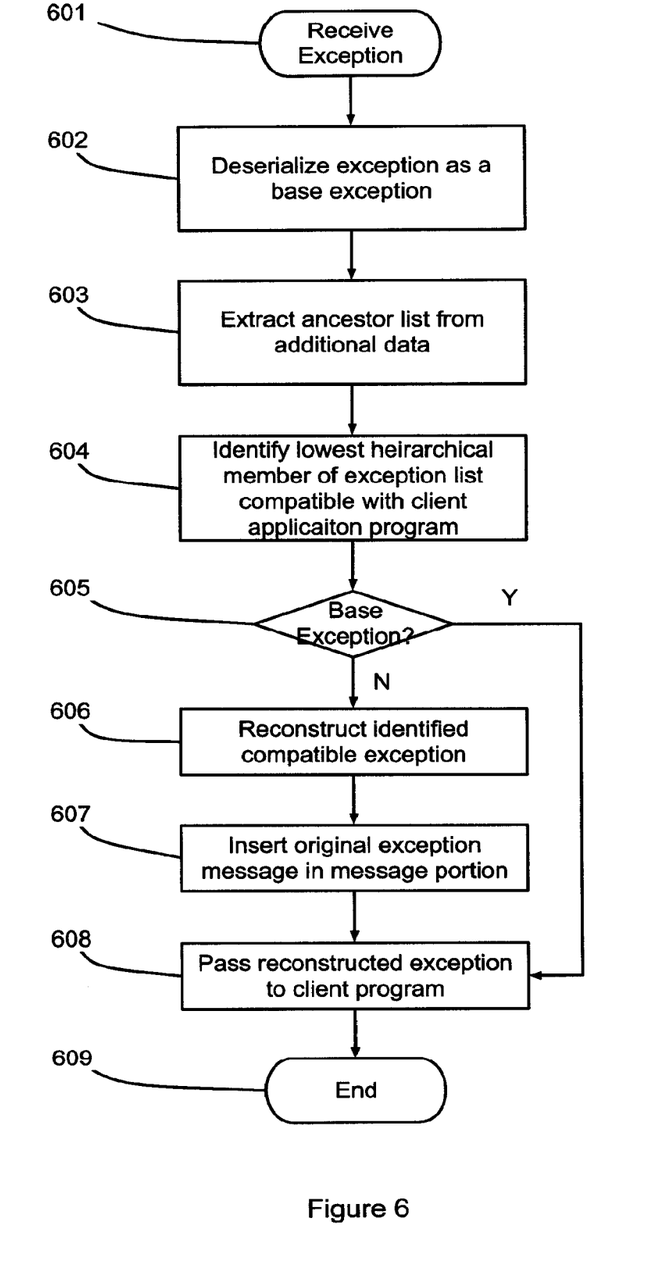

The processing performed by the client exception handler 208 when processing an incoming exception received over the network destined for the client application program 204 will now be described in further detail with reference to the flow chart of FIG. 6. Processing is initiated at step 601 by the receipt of an incoming exception destined for the client application program 204 and processing moves to step 602. At step 602, the received exception is deserialized as a base exception object and processing moves to step 603. At step 603, the additional data is deserialized to provide the metadata in the form of the ordered ancestor list for the original exception and processing moves to step 604. At step 604, the lowest hierarchical member of the ancestor list that is present in the client exception hierarchy, which may be the original exception itself, is identified and processing moves to step 605. At step 605, unless the identified ancestor is the base exception, processing moves to step 606. At step 606, the base exception is reconstructed as the identified ancestor exception, which may be the original exception itself, and processing moves to step 607. At step 607, the exception message from the received base exception is inserted into the reconstructed ancestor exception and processing moves to step 608. At step 608, the reconstructed exception is passed to the client application program 204 and processing ends at step 609. If at step 605 the lowest hierarchical member of the ancestor list that is present in the client exception hierarchy is, in fact, the base exception, then processing moves directly to step 608 where the received base exception is passed the client application program 204 and processing ends at step 609.

In another embodiment, the exception handling functionality handling an outgoing exception is arranged to provide a substitute exception based on knowledge of the version of the application program that is the destination of the exception. For example, if a given client is the latest version then the original exception may be forwarded without change. In another example, where the client application program is an older version, the original exception may be substituted for the lowest hierarchical exception that can be processed by the client application program. In other words, in these embodiments, no additional processing of exceptions is required by the client application program since the server application program is provided with knowledge to enable it to determine the applicable substitute exception for a given original exception. One mechanism for providing such knowledge is by tagging the exception hierarchy with data indicating the version to which a given exception is applicable.

In a further embodiment, the substitute exception comprises only the base exception and the original exception. The original exception may be stored either in the exception data field or in the metadata field. In another embodiment, substitute exception comprises only the base exception, original exception and a selected subset of the intermediate exceptions.

As will be understood by those skilled in the art, any suitable format may be provided for communicating exceptions between application programs. Some formats may not comprise an exception data field. Some formats may be arranged to carry a full copy of the original exception, which may be entered as a whole into the exception data field of a base exception. Some formats may omit metadata. As will be understood by those skilled in the art, some exception subclasses may themselves contain additional data beyond a common message field. The exception format can be arranged to enable such additional data to be made available to a given client if it is able to receive it.

As will be understood by those skilled in the art, while providing an exception hierarchy may be best practice, other structures for exception sets may be provided. For example, the hierarchy may be simplified. The hierarchy may comprise an ordered list of sets or groups of exceptions. There may be relatively few exceptions with no defined hierarchy. The exceptions may be structured as a group of separate ordered lists.

As will be understood by those skilled in the art, embodiments described above are implemented using the Java™ software platform. Other object oriented software platforms such as Web Services in which extensions to the Simple Object Access Protocol (SOAP™) serialization/deserialization functionality may be inserted for providing embodiments of the invention as described above.

As will be understood by those skilled in the art, while embodiments are described above in relation to object-oriented software systems, further embodiments may be arranged to provide equivalent exception handling functionality in non object-oriented processing environments. As will be understood by those skilled in the art, in such non object-oriented environments, the serialization/deserialization functionality is not generally required.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs.

Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. A method for processing exceptions produced by an application program, said method comprising the steps of:
   a) identifying in an exception handler module executing in memory by a processor of a computer, a first set of exceptions produced by both a first version of a first application program and by a second version of said first application program subsequent to said first version;
   b) identifying a second set of exceptions produced by said second version of said first application program but not by said first version;
   c) receiving an original exception from said second set of exceptions from said second version of said first application program;
   d) substituting said original exception for a predetermined substitute exception from said first set of exceptions; and
   e) appending an identification of said original exception as metadata to said substitute exception so as to enable a second application program receiving said substitute exception but not arranged to process said second set of exceptions to process said substitute exception and to enable a third application program receiving said substitute exception and arranged to process members of said second set of exceptions to extract and process said original exception.

2. A method according to claim 1 in which said third application program is a subsequent version of said second application program.

3. A method according to claim 1 in which said first application program is a server application program and said second and third application programs are client application programs corresponding to said server application program.

4. A method according to claim 1 in which said first and second sets of exceptions comprise an exception hierarchy having a root exception at the root of said hierarchy and said substitute exception is a selected ancestor to said original exception in said hierarchy.

5. A method according to claim 1 in which said metadata comprises an ordered list of substitute exceptions in the form of a plurality of selected ancestors to said original exception in accordance with said hierarchy.

6. A method according to claim 5 in which said ordered list comprises all ancestors to said original exception.

7. A method according to claim 4 in which said substitute exception is said root exception.

8. A method according to claim 1 in which said original exception comprises message data in an exception data portion and said message data is replicated in an exception data portion for said substitute exception.

9. A method according to claim 1 in which said method comprises a part of a serialization process to enable transmission of exception objects to communicating application programs.

10. A method according to claim 9 in which said substitute exception is specified as a replacement object for said original exception object in said serialization process.

11. A method according to claim 9 in which said metadata is serialized as additional data associated with said substitute exception object in said serialization process.

12. A method for processing an exception received from an application program, said method comprising the steps of:
   a) receiving in an exception handler module executing in memory by a processor of a computer, exception data for an application program, said received exception data comprising a first exception and metadata identifying a second exception;
   b) identifying the set of exceptions that said application program is capable of processing;
   c) if said application program is capable of processing said first exception then providing said first exception to said application program for processing; and
   d) if said application program is not capable of processing said first exception then providing said second exception to said application program for processing.

* * * * *